(12) United States Patent
Soga

(10) Patent No.: US 7,170,759 B2
(45) Date of Patent: Jan. 30, 2007

(54) DISPLAY APPARATUS

(75) Inventor: Takayuki Soga, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 22 days.

(21) Appl. No.: 11/073,926

(22) Filed: Mar. 8, 2005

(65) Prior Publication Data
US 2005/0212982 A1 Sep. 29, 2005

(30) Foreign Application Priority Data
Mar. 10, 2004 (JP) ............................... 2004-067854

(51) Int. Cl.
*H02B 13/045* (2006.01)
*H05K 7/14* (2006.01)

(52) U.S. Cl. ....................... 361/825; 361/681; 361/682; 361/752

(58) Field of Classification Search ................ 361/752, 361/681, 682, 683, 825; 248/917, 825; 313/461
See application file for complete search history.

(56) References Cited

U.S. PATENT DOCUMENTS 5,583,529 A * 12/1996 Satou ........................... 345/87
6,144,552 A * 11/2000 Whitcher et al. ........... 361/681
6,560,124 B1 * 5/2003 Irie et al. ..................... 361/816
6,688,576 B2 * 2/2004 Oishi et al. .................. 248/317
6,813,159 B2 * 11/2004 Irie et al. ..................... 361/752
6,859,357 B2 * 2/2005 Morimoto et al. .......... 361/681

FOREIGN PATENT DOCUMENTS

JP          9-172590          6/1997

* cited by examiner

*Primary Examiner*—Elvin Enad
*Assistant Examiner*—Dameon E. Levi
(74) *Attorney, Agent, or Firm*—Pillsbury Winthrop Shaw Pittman LLP

(57) ABSTRACT

A display apparatus that is suitable to be mounted on the wall and is easy to assemble. The display apparatus includes a flat display panel, a chassis frame attached to the back of the flat display panel, and a front cabinet attached to the front of the flat display panel. The flat display panel is provided with lugs on its side surface. The chassis frame is provided with lugs whose positions correspond to the lugs of the flat display panel. Fittings are attached to the back of the front cabinet. Positions of the fittings also correspond to the lugs of the flat display panel. The lugs of the chassis frame and the lugs of the flat display panel are fixed together and are fixed to the fittings with screws.

8 Claims, 5 Drawing Sheets

DISPLAY APPARATUS

CROSS-REFERENCE TO RELATED APPLICATIONS

This application is based upon and claims the benefit of priority from the prior Japanese Patent Application No. 2004-67854 filed on Mar. 10, 2004; the entire contents of which are incorporated herein by reference.

BACKGROUND OF THE INVENTION

1. Field of the Invention

The present invention relates to a display apparatus using a flat display panel.

2. Description of the Related Art

Recently, display apparatuses, such as TV sets, using a flat display panel have been becoming popular. Examples of the flat display panel include a liquid crystal display (LCD) panel and a plasma display panel. Display apparatuses using a flat display panel are thin. Therefore, portable TVs and wall-mounted TVs have been put to practical use by means of a flat display panel.

For example, Japanese published patent application No. H09-172590 (hereinafter referred to as "the document") discloses a display apparatus that is compact using a large flat display panel. The display apparatus disclosed in the document includes a top case (constituting a front case), an LCD panel, a center case, and a bottom case. The front case corresponds to the front cabinet of the present invention. The LCD panel is disposed between the front case and the middle case, and they are fixed together with screws. A backlight device is attached on the back of the middle case. The backlight device includes a backlight, a reflector plate, and a diffuser plate. A circuit board for drive control of the LCD panel is attached to the rear case. The rear case and the middle case are fixed together with screws.

The display apparatus disclosed in the document is placed on a desk by means of a stand provided on the back of the rear case. However, in order to increase the screen size of the display apparatus, and in order to use the display apparatus as a wall-mounted display apparatus, various modifications are necessary.

As described above, the display apparatus disclosed in the document has a structure in which the LCD panel is disposed between the front case and the middle case; the backlight device is attached to the middle case; and the assembly of the front case, the LCD panel, the middle case, and the backlight device is fixed to the rear case. Therefore, the display apparatus disclosed in the document is too front-heavy, and it does not have enough strength to be used as a wall-mounted display apparatus.

In addition, in the display apparatus disclosed in the document, when the front case is removed in order to tune or check the functions, it is necessary to separate the front case from the middle case. However, when the front case is separated from the middle case, the LCD panel is also separated from the middle case. Since the front case, the middle case, and the LCD panel are separated from each other, tuning and checking are difficult.

SUMMARY OF THE INVENTION

It is an object of the present invention to provide a display apparatus that is compact using a large flat display panel, suitable for mounting on the wall, easy to construct, and easy to tune and check.

In an aspect of the present invention, a display apparatus includes a flat display panel, a front cabinet, a plurality of fittings, a chassis frame, and a plurality of fixing devices. The flat display panel has an image display section on its front surface, and is provided with a plurality of lugs, which supports the panel, on the side surface circumference of the image display section. The front cabinet is attached to the front surface of the flat display panel. The plurality of fittings are attached on the back surface of the front cabinet, positions of the plurality of fittings corresponding to the plurality of lugs of the flat display panel. The chassis frame is attached to the back surface of the flat display panel, and is provided with a plurality of lugs, positions of the plurality of lugs corresponding to the plurality of lugs of the flat display panel. The plurality of fixing devices serve for fixing the plurality of lugs of the chassis frame and the plurality of lugs of the flat display panel together so as to fix the chassis frame and the flat display panel together, and for fixing the plurality of lugs of the chassis frame and the plurality of lugs of the flat display panel to the plurality of fittings.

In another aspect of the present invention, a display apparatus includes a flat display panel, a front cabinet, a plurality of lug fittings, a chassis frame, and a plurality of fixing devices. The flat display panel has an image display section on its front surface. The front cabinet is attached to the front surface of the flat display panel. The plurality of lug fittings are attached to the circumferential upper through side surfaces of corners of the flat display panel, each of the plurality of lug fittings having a lug of which a part is protruding. The chassis frame is attached to the back surface of the flat display panel, and is provided with a plurality of lugs, positions of the plurality of lugs corresponding to the lugs of the plurality of lug fittings. The plurality of fixing devices serve for fixing the plurality of lugs of the chassis frame and the lugs of the plurality of lug fittings together so as to fix the chassis frame and the flat display panel together, and for fixing the lugs of the plurality of lug fittings to the front cabinet.

The above and other objects, features and advantage of the invention will become more clearly understood from the following description referring to the accompanying drawing.

DETAILED DESCRIPTION OF THE INVENTION

Figure 1:
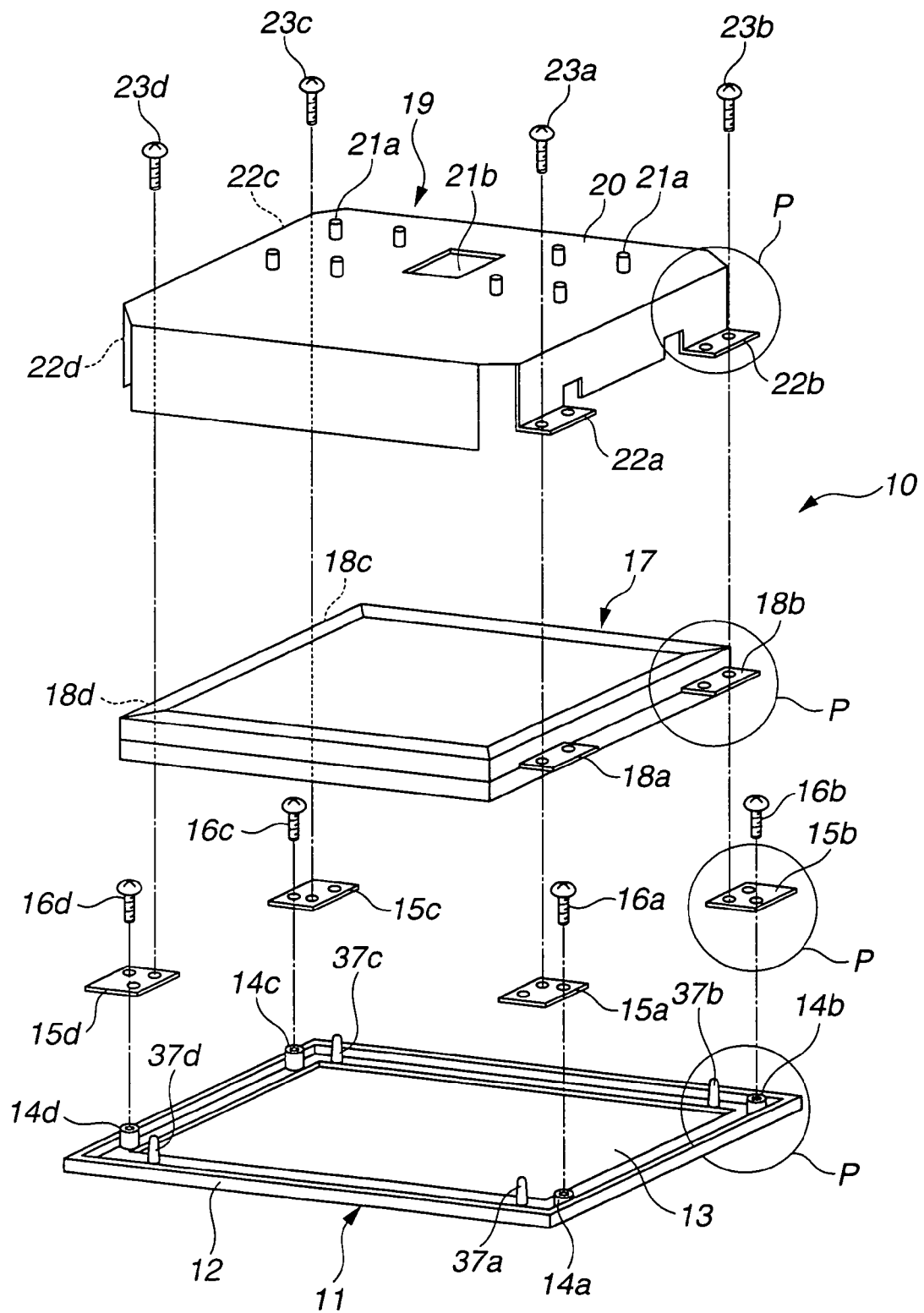
FIG. 1 is an exploded perspective view showing the structure of a display apparatus according to a first embodiment of the present invention.

FIG. 1 is an exploded perspective view showing the structure of a display apparatus according to a first embodiment. The display apparatus is described taking a TV set using an LCD panel for example. The display apparatus can also be applied to display apparatuses using other flat display panels such as plasma display panels.

In FIG. 1, the TV set 10 is mainly composed of a front cabinet 11, a flat display panel 17, a chassis frame 19, and a back cover (not shown). The front cabinet 11, the flat display panel 17, and the chassis frame 19 are fixed together by means of four fittings 15a to 15d.

In the description of the first embodiment, for the sake of convenience for explanation, the fittings 15a to 15d are collectively represented by reference numeral 15 sometimes. Various parts are provided in or fixed to each of the fittings 15a to 15d. Character a, b, c, or d is added to the reference numerals representing such parts. However, the character is sometimes omitted for the sake of convenience.

The flat display panel 17 includes an LCD panel and a built-in backlight device (not shown). The flat display panel 17 further includes an image display section (provided on the underside of the flat display panel 17 in FIG. 1) and a driver circuit for driving the image display section. At side surfaces of four corners of the flat display panel 17, lugs, which support the panel, 18a to 18d are provided (lugs 18c and 18d are not shown). The lugs 18a to 18d are provided with screw holes through which screws 23a to 23d are passed.

The front cabinet 11 includes a mask frame 12 forming an opening 13 through which the image display section is exposed. In the vicinities of four corners of the mask frame 12, screw bosses 14a to 14d and positioning bosses 37a to 37d are provided. The fittings 15a to 15d are disposed over the screw bosses 14a to 14d and the positioning bosses 37a to 37d. The screw bosses 14a to 14d are provided with internal threads into which screw 16a to 16d are screwed.

The chassis frame 19 is formed of metal into a box-shape. A plurality of pillars 21a are provided on the outer surface (the top surface in the figure) of the chassis frame 19. A circuit board (not shown) is attached to the pillars 21a. On the circuit board, various circuits for driving the main body of the display apparatus are provided by printing. For example, a video-signal processing circuit and a power supply circuit are provided. In addition, the chassis frame 19 is provided with an opening 21b for passing wires.

On the side surfaces in the vicinities of four corners of the chassis frame 19, lugs 22a to 22d are provided (22c and 22d are not shown). The lugs 22a to 22d correspond to the lugs, which support the panel, 18a to 18d. The lugs 22a to 22d of the chassis frame 19 project outward from the side surfaces of the chassis frame 19. The lugs 22a to 22d of the chassis frame 19 are fixed to the lugs 18a to 18d of the flat display panel 17, respectively. The lugs 22a to 22d are provided with screw holes through which screws 23a to 23d described later are passed.

Each fitting 15 is provided with a screw hole that faces one of the screw bosses 14a to 14d of the front cabinet 11, and a through-hole that faces one of the positioning bosses 37a to 37d of the front cabinet 11. In addition, each fitting 15 is provided with another screw hole through which one of the screws 23a to 23d is passed. The screws 23a to 23d fix the lugs 18a to 18d of the flat display panel 17 and the lugs 22a to 22d of the chassis frame 19 together.

The fittings 15a to 15d are placed over the screw bosses 14a to 14d and the positioning bosses 37a to 37d, and are then fixed to the front cabinet 11 with the screws 16a to 16d.

The lugs 18a to 18d of the flat display panel 17 and the lugs 22a to 22d of the chassis frame 19 are fixed with the screws 23a to 23d to the fittings 15a to 15d, which are fixed to the front cabinet 11.

Next, the structure of the main part of each of the chassis frame 19, the flat display panel 17, and the front cabinet 11, and the structure of the fitting 15 will be described with reference to FIGS. 2 to 5. FIGS. 2 to 5 are enlarged perspective views showing the corner parts in the circles P in FIG. 1. Since the other corners have the same structure, only one corner is shown.

Figure 2:
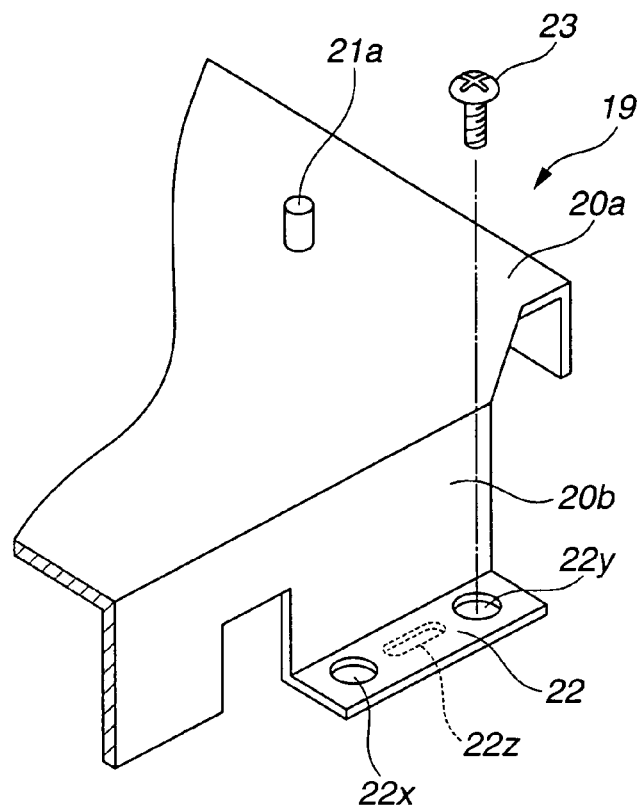
FIG. 2 is a perspective view showing the main part of a chassis frame of the display apparatus according to the first embodiment of the present invention.

The lug 22 of the chassis frame 19 will be described with reference to FIG. 2. The chassis frame 19 is formed substantially in a box-shape, and has a flat portion 20a and a side portion 20b. The chassis frame 19 covers the flat display panel 17. A plurality of pillars 21a is provided on the flat portion 20a. A circuit board (not shown) is attached to the pillars 21a. The pillars 21a maintain the distance between the circuit board and the flat portion 20a, and the circuit board is mechanically fixed to the pillars 21a.

In the vicinity of the corner of the chassis frame 19, from the front edge (the lower edge in FIG. 2) of the side portion 20b, the lug 22, which supports the chassis frame 19, projects parallel to the flat portion 20a. The lug 22 is substantially rectangular. The lug 22 is provided with two screw holes 22x and 22y. A positioning ridge 22z is provided on the back side (the underside in FIG. 2) of the lug 22.

Figure 3:
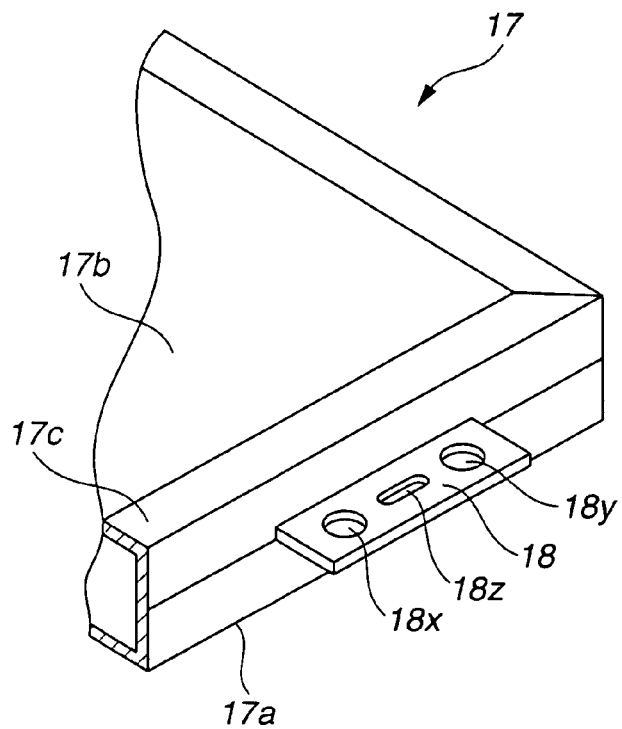
FIG. 3 is a perspective view showing the main part of a flat display panel of the display apparatus according to the first embodiment of the present invention.

The lug 18 of the flat display panel 17 will be described with reference to FIG. 3. The lug 18 is provided on the side surface in the vicinity of the corner of the flat display panel 17. The flat display panel 17 has a front surface 17a and a back surface 17b. An outer frame 17c covers the edges of the front surface 17a and the back surface 17b. The lug 18 projects outward from the outer frame 17c. The lug 18 is provided with two screw holes 18x and 18y and a positioning groove 18z.

The lug 18, which supports the panel, is provided in the position corresponding to the lug 22 of the chassis frame 19. The screw 23 is passed through the screw hole 18y of the lug 18 and the screw hole 22y of the lug 22 of the chassis frame 19. The positioning ridge 22z of the lug 22 is fitted into the positioning groove 18z of the lug 18. In this way, relative positioning between the chassis frame 19 and the flat display panel 17 is performed.

Figure 4:
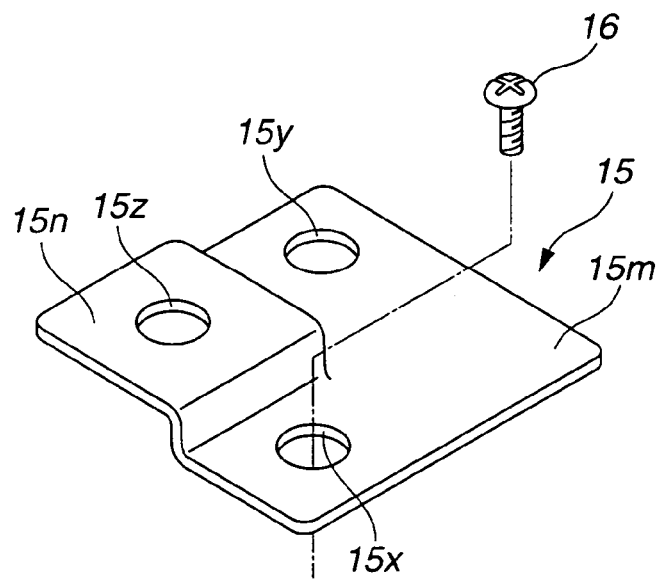
FIG. 4 is a perspective view of a fitting of the display apparatus according to the first embodiment of the present invention.

The fitting 15 will be described with reference to FIG. 4. The fitting 15 is substantially rectangular. The fitting 15 includes a flat base 15m and an elevation 15n. The base 15m is provided with a screw hole 15x and a positioning hole 15y. The elevation 15n is provided with a screw hole 15z.

The screw 23 is screwed into the screw hole 15z of the elevation 15n. That is to say, after passing through the screw hole 22y of the lug 22 of the chassis frame 19 and the screw hole 18y of the lug 18, the screw 23 screws into the screw hole 15z of the elevation 15n. The screw 23 fixes the chassis frame 19, the flat display panel 17, and the fitting 15 together. The screw hole 15x and the positioning hole 15y of the base 15m are provided in the vicinities of two opposing corners of the base 15m. The screw hole 15x, the positioning hole 15y, and the screw hole 15z are located at the apexes of a regular triangle.

Figure 5:
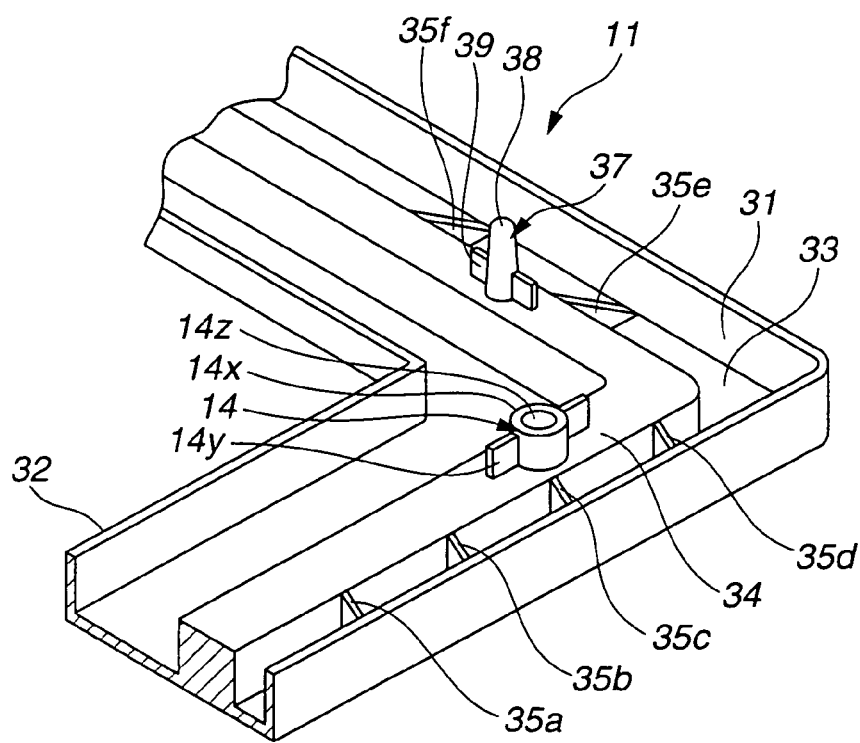
FIG. 5 is a perspective view showing the main part of a front cabinet of the display apparatus according to the first embodiment of the present invention.

The structure of the corner of the front cabinet 11 will be described with reference to FIG. 5. FIG. 5 is a perspective view showing the structure of the screw boss 14 and the positioning boss 37 provided in the front cabinet 11.

The front cabinet 11 covers the edge of the front portion of the flat display panel 17. The front cabinet 11 forms a frame 12 (see FIG. 1) composed of an outer wall 31, an inner wall 32, a flat base 33 between the outer wall 31 and the inner wall 32, and a bank 34 projecting from the flat base 33 toward the flat display panel 17. The screw boss 14 and the positioning boss 37 are provided on the bank 34 with the corner between. Strengthening ribs 35a to 35f are provided between the bank 34 and the outer wall 31 at predetermined intervals.

The screw boss 14 is composed of a cylindrical main body 14x and a pair of ribs 14y for strengthening the main body 14x. A screw hole 14z is centered on the main body 14x. The positioning boss 37 is composed of a tapered cylindrical main body 38 and a pair of ribs 39 for strengthening the main body 38. Into the main body 38 of the positioning boss 37 the positioning hole 15y of the fitting 15 is fitted. After passing through the screw hole 15x of the fitting 15, the screw 16 screws into the cylindrical main body 14x of the screw boss 14 so as to fix the fitting 15 to the front cabinet 11. In this way, the fitting 15 is positioned and attached to the screw boss 14 and the positioning boss 37 of the front cabinet 11.

Next, the procedure for assembling the front cabinet 11, the flat display panel 17, and the chassis frame 19 by means of the fittings 15 will be described. First, in each corner of the front cabinet 11, the fitting 15 is positioned by the tapered cylindrical main body 38 of the positioning boss 37 and the cylindrical main body 14x of the screw boss 14, and is then fixed to the front cabinet 11 with the screw 16. That is to say, the tapered cylindrical main body 38 of the positioning boss 37 is fitted into the positioning hole 15y of the fitting 15; the screw 16 is passed through the screw hole 15x of the fitting 15, and is then screwed into the cylindrical main body 14x of the screw boss 14. In this way, the fittings 15 are fixed to the front cabinet 11.

Next, the lugs 18 provided at four corners of the flat display panel 17 are positioned on the lugs 22 provided at four corners of the chassis frame 19. The screws 23 are then passed through the screw holes 22y of the lugs 22 and the screw holes 18y of the lugs 18. After passing through the lugs 22 and 18, the screws 23 pass through the screw holes 15z of the fittings 15, and are then tightened. In this way, the flat display panel 17 is fixed to the chassis frame 19, and is fixed to the front cabinet 11 via the fittings 15. In the case where other screws are passed through the screw holes 22x of the lugs 22 and the screw holes 18x of the lugs 18, and are then tightened, the chassis frame 19 and the lugs 18 can be more firmly fixed together.

After the front cabinet 11, the flat display panel 17, and the chassis frame 19 are fixed together by means of the fittings 15, the chassis frame 19 is covered with a back cover 41.

Figure 6:
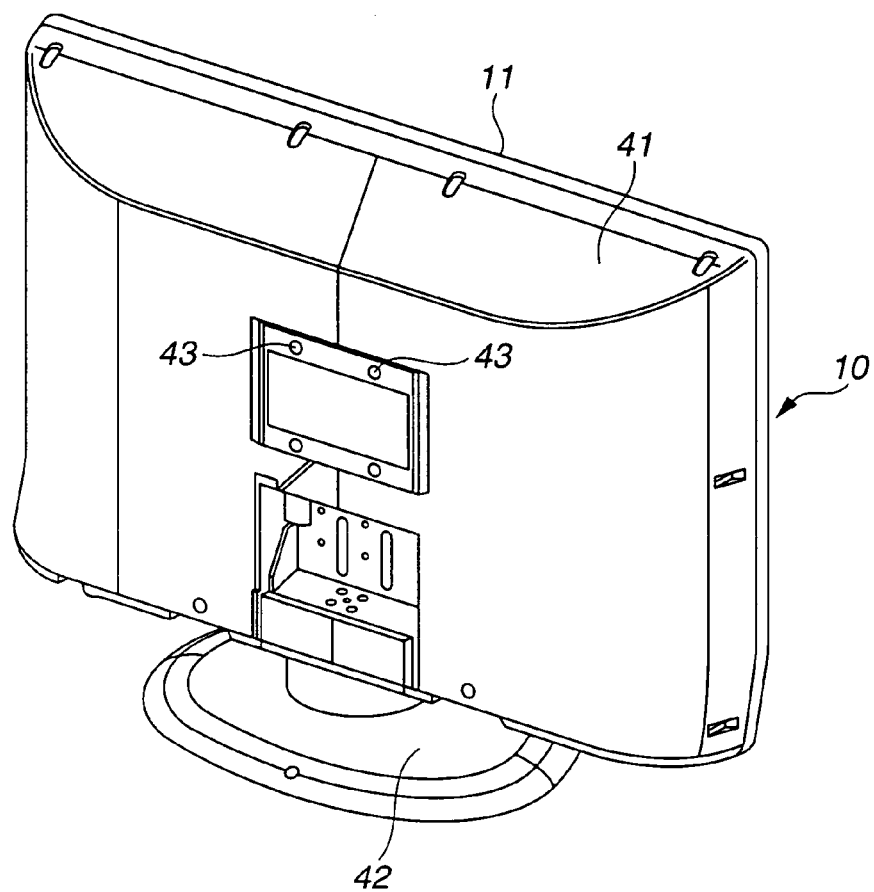
FIG. 6 is a back view showing the structure of the back of the display apparatus according to the first embodiment of the present invention.

The chassis frame 19 covered with the back cover 41 will be described with reference to FIG. 6. FIG. 6 is a back view of the TV set 10 with the back cover 41 attached.

The TV set 10 of FIG. 6 is provided with a stand on its underside. The stand 42 supports the TV set 10. The TV set 10 with the stand 42 removed can be mounted on the wall.

A plurality of wall-mounting members 43 are provided on the back of the back cover 41. The wall-mounting members 43 are coupled with another metal chassis that is provided inside the back cover 41 and is fixed to the chassis frame 19.

A wall-mounting fitting is attached to the wall-mounting members 43. By means of the wall-mounting fitting, the TV set 10 can be mounted on the wall.

Figure 7:
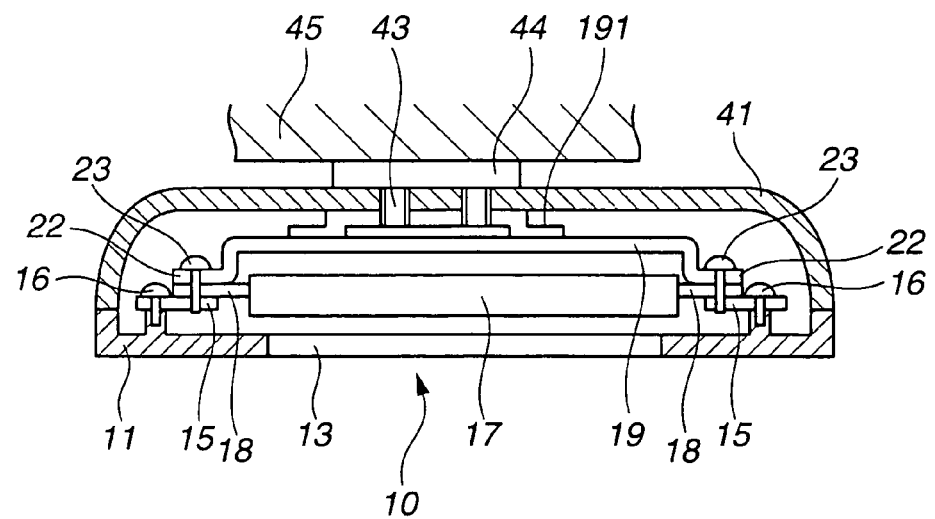
FIG. 7 is a sectional-view showing the display apparatus mounted on the wall according to the first embodiment of the present invention.

FIG. 7 shows the TV set 10 mounted on the wall. In FIG. 7, the flat display panel 17 is fixed to the chassis frame 19 with the screws 23 and the fittings 15. The metal chassis 191 is fixed to the chassis frame 19. The wall-mounting members 43 are attached to the metal chassis 191 and the back cover 41. The wall-mounting members 43 are fixed to the wall-mounting fitting 44. In this way, the TV set 10 is mounted on the wall 45. The structure of the wall-mounting members 43 and the wall-mounting fitting 44 will not be described in detail. The wall-mounting members 43 and the wall-mounting fitting 44 may have any structure as long as they can be fixed to the wall. The wall-mounting members 43 are originally used for mounting the TV-set 10 on the wall 45. However, in the case where the TV set 10 is mounted on a stand 42, the wall-mounting members 43 can also be used for mounting an external additional device (for example, a HDD) on the TV set 10.

As shown in FIG. 7, when the TV set 10 is mounted on the wall, the weight of the flat display panel 17 is supported by the chassis frame 19. Accordingly, the center of gravity on the TV set shifts to the chassis frame 19. Therefore, even if an external shock is caused on the TV set 10 mounted on the wall, the flat display panel 17 is prevented from dropping off the wall.

When the front cabinet 11 is removed in order to tune or check the circuit board provided on the chassis frame 19, first, the TV set 10 is removed from the wall 45, next, the back cover 41 is removed, thereafter, the screws 16 are taken out. Therefore, without separating the chassis frame 19 and the flat display panel 17, the circuit board provided on the chassis frame 19 can be tuned or checked. Similarly, when the front cabinet 11 is replaced, it is easy to remove the TV set 10 from the wall 45 and to remove the front cabinet 11.

In the above description, when the front cabinet 11, the flat display panel 17, and the chassis frame 19 are assembled, first, the fittings 15 are fixed to the front cabinet 11, next, the lugs 18 of the flat display panel 17 and the lugs 22 of the chassis frame 19 are fixed to the fittings 15. However, the order of assembly is not limited to this.

The elevation 15n is provided in the fitting 15 so that the front surface 17a of the flat display panel 17 and the edge of the inner wall 32 of the front cabinet 11 have no gap between. The elevation 15n does not always have to be provided in the fitting 15.

Figure 8:
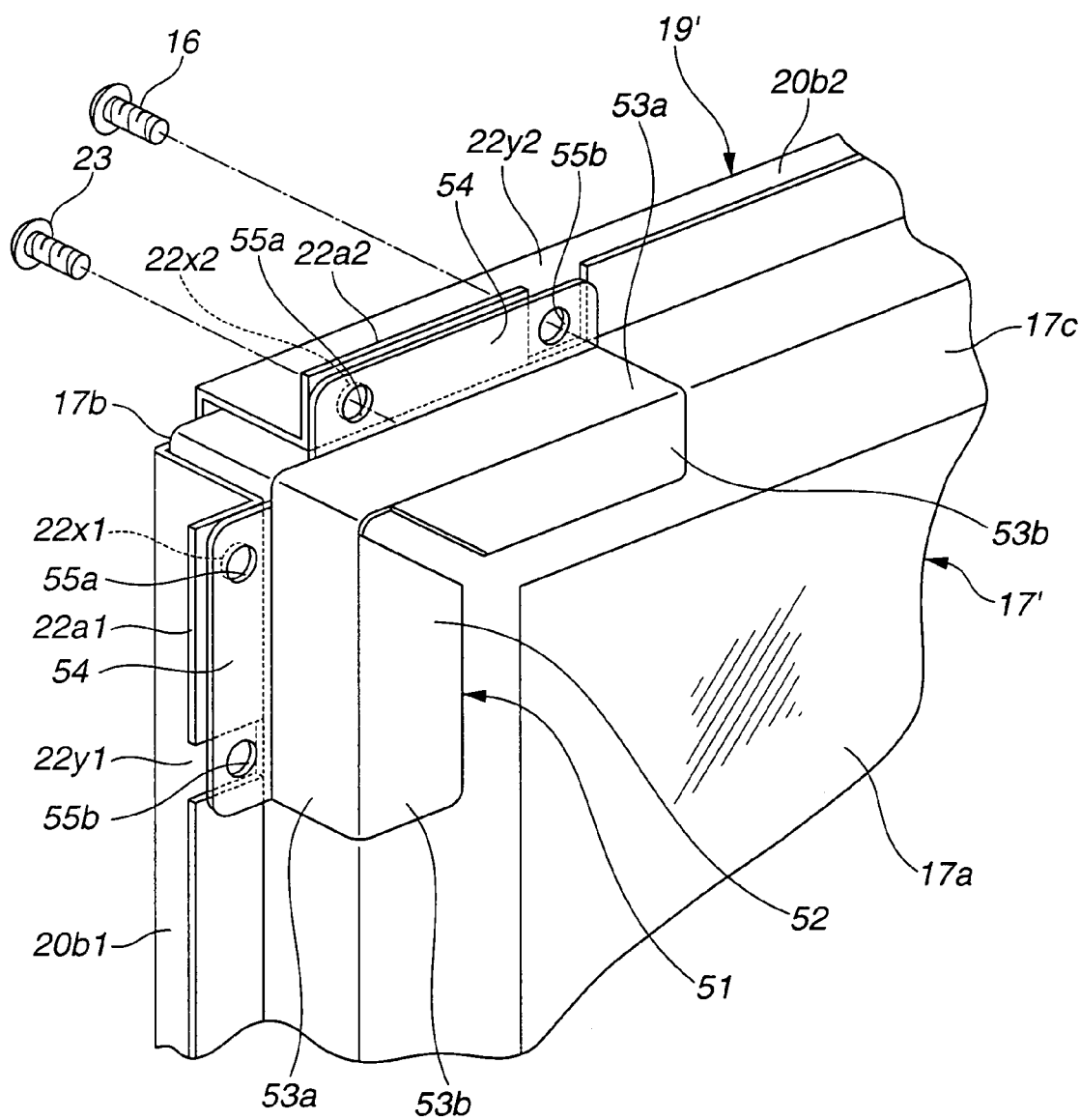
FIG. 8 is a perspective view showing the structure of the main part of a display apparatus according to a second embodiment of the present invention.

Next, a second embodiment of the present invention will be described with reference to FIG. 8. FIG. 8 is a perspective view showing an example where a flat display panel 17' having no lugs 18 is fixed to a chassis frame 19' by means of lug fittings 51.

Unlike the flat display panel 17 of the first embodiment, the flat display panel 17' of the second embodiment has no lugs 18 at four corners. The lug fittings 51 are attached to four corners of the outer frame 17c of the flat display panel 17'. By means of the lug fittings 51, the flat display panel 17' is fixed to the chassis frame 19'.

The lug fitting 51 includes a panel fitting position 52 and two lug units 54. The panel fitting position 52 is composed of a side portion 53a and two front portions 53b. The side portion 53a is bent at a right angle so as to fit the top through side surface of the corner of the flat display panel 17'. The front portions 53b are perpendicular to the side portion 53a so as to be attached to the front surface 17a of the flat display panel 17'. The lug units 54 are provided on the opposite side of the side portion 53a from the front portions 53b, and are perpendicular to the side portion 53. Each lug unit 54 is provided with a first screw hole 55a and a second screw hole 55b. The first screw hole 55a is provided for fixing the chassis frame 19' to the flat display-panel 17'. The second screw hole 55b is provided for fixing the flat display panel 17' to the front cabinet 11 (not shown).

On the side surfaces 20b1 and 20b2 at the corner of the chassis frame 19', lugs 22a1 and 22a2 are provided, respectively. The lug 22a1 is provided with a screw hole 22x1 and a cut 22y1. The lug 22a2 is provided with a screw hole 22x2 and a cut 22y2. The lugs 22a1 and 22a2 face the lug units 54 of the lug fitting 51. The screw holes 22x1 and 22x2 face the first screw holes 55a of the lug units 54. The cuts 22y1 and 22y2 face the second screw holes 55b of the lug units 54. The cuts 22y1 and 22y2 are provided for passing the screws 16 when the lug units 54 are fixed to the front cabinet 11 (not shown) with the screws 16.

How to fix the flat display panel 17' and the chassis frame 19' together by means of the lug fittings 51 will be described. First, the panel fitting position 52 of the lug fitting 51 is attached to the corner of the outer frame 17c of the flat display panel 17. Next, the chassis frame 19' is attached to the back surface 17b of the flat display panel 17' to which the lug fitting 51 is attached. At each corner of the chassis frame 19', the screws 23 are screwed into the screw hole 22x1 of the lug 22a1 and the first screw hole 55a of the lug fitting 51, and are also screwed into the screw hole 22x2 of the lug 22a2 and the first screw hole 55a of the lug fitting 51. In this way, the flat display panel 17' is fixed to the chassis frame 19' via the lug fittings 51.

Next, the front cabinet 11 is attached to the front surface 17a of the flat display panel 17'. The screws 16 are screwed into the cuts 22y1 and 22y2 of the lugs 22a1 and 22a2 at the chassis frame 19' and the second screw hole 55b of the lug unit 54, and are also screwed into the cuts 22y1 and 22y2 of the lugs 22a1 and 22a2 and the second screw hole 55b of the lug unit 54. The screws 16 are then screwed into the screw bosses 14 of the front cabinet 11.

That is to say, the front cabinet 11 is fixed to the lug units 54 of the lug fittings 51 with the screws 16. In this way, the flat display panel 17' is directly fixed to the chassis frame 19' by means of the lug fittings 51, and the weight of the flat display panel 17' is supported by the chassis frame 19'.

Cushioning material may be provided between the outer frame 17c of the flat display panel 17' and the lug fitting 51, or between the back surface 17b of the flat display panel 17' and the chassis frame 19' so as to protect the flat display panel 17'. The second embodiment shown in FIG. 8 can also be mounted on the wall 45 by attaching the back cover 41 and by using the wall-mounting members 43 and the wall-mounting fitting 44.

As described above, the display apparatus according to each embodiment of the present invention is compact using a large flat display panel, suitable for mounting on the wall, easy to assemble the front cabinet, the flat display panel and the chassis frame.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A display apparatus comprising:
a flat display panel having an image display section on its front surface and provided with a plurality of lugs, which supports the panel, on its side surface;
a front cabinet attached to the front surface of the flat display panel;
a plurality of fittings attached on the back surface of the front cabinet, positions of the plurality of fittings corresponding to the plurality of lugs of the flat display panel;
a chassis frame attached to the back surface of the flat display panel and provided with a plurality of lugs, which supports the panel, positions of the plurality of lugs corresponding to the plurality of lugs of the flat display panel; and
a plurality of fixing devices for fixing the plurality of lugs of the chassis frame and the plurality of lugs of the flat display panel together so as to fix the chassis frame and the flat display panel together, and for fixing the plurality of lugs of the chassis frame and the plurality of lugs of the flat display panel to the plurality of fittings, wherein the plurality of fittings attached on the back surface of the front cabinet, the plurality of lugs which supports the panel provided to the flat display panel, and the plurality of lugs of the chassis frame are fixed together only by the fixing devices.

2. The display apparatus according to claim 1, wherein each of the plurality of fittings has a substantially rectangular main body; the main body is provided with a screw hole and positioning portion for determining a position in the front cabinet to which the fitting is attached; and the fitting is attached to the front cabinet by determining the position with the positioning device and by screwing a screw into the screw hole.

3. The display apparatus according to claim 1, wherein the plurality of fixing devices for fixing the plurality of lugs of the chassis frame and the plurality of lugs of the flat display panel together are screws.

4. The display apparatus according to claim 1, further comprising a back cover for covering the chassis frame, the back cover being integrally fixed to the front cabinet, the back surface of the back cover being provided with a wall-mounting member.

5. A display apparatus comprising:
a flat display panel having an image display section on its front surface;
a front cabinet attached to the front surface of the flat display panel;
a plurality of lug fittings attached to the circumferential upper through side surfaces of corners of the flat display panel, each of the plurality of lug fittings having a lug of which a part is protruding;
a chassis frame attached to the back surface of the flat display panel and provided with a plurality of lugs, positions of the plurality of lugs corresponding to the lugs of the plurality of lug fittings; and
a plurality of fixing devices for fixing the plurality of lugs of the chassis frame and the lugs of the plurality of lug fittings together so as to fix, the chassis frame and the flat display panel together, and for fixing the lugs of the plurality of lug fittings to the front cabinet, wherein the lugs of the plurality of lug fittings attached to the circumferential upper through side surfaces of corners of the flat display panel, the plurality of lugs of the chassis frame, and the front cabinet are fixed together only by the fixing devices.

6. The display apparatus according to claim 5, wherein each of the plurality of lug fittings includes a first portion attached to the front surface of the flat display panel, and a second portion attached to the side surface of the flat display panel; and the lug of each of the plurality of lug fittings projects from the second portion.

7. The display apparatus according to claim 5, further comprising a back cover for covering the chassis frame, the back cover being integrally fixed to the front cabinet, the back surface of the back cover being provided with a wall-mounting member.

8. A display apparatus comprising:
a flat display panel having an image display section on its front surface and provided with a plurality of lugs, on its side surface;
a front cabinet provided with a plurality of fittings on its back surface, and the plurality of fittings attached to the plurality of lugs of the flat display panel;
a chassis frame provided with a plurality of lugs, attached to the plurality of lugs of the flat display panel, wherein the plurality of lugs on the side surface of the flat display panel, the fittings provided on the back surface of the front cabinet, and the plurality of lugs of the chassis frame are fixed together.

* * * * *